United States Patent [19]
Irie

[11] Patent Number: 5,589,908
[45] Date of Patent: Dec. 31, 1996

[54] CONTROL FOR VARIABLE MAGNIFICATION IN AN IMAGING APPARATUS

[75] Inventor: Yoshiaki Irie, Yokohama, Japan

[73] Assignee: Canon Kabushiki Kaisha, Tokyo, Japan

[21] Appl. No.: 338,780

[22] Filed: Nov. 10, 1994

[30] Foreign Application Priority Data

Nov. 29, 1993 [JP] Japan .................. 5-298573

[51] Int. Cl.⁶ ...................................... G03B 3/00
[52] U.S. Cl. .................. 396/51; 396/77; 396/79
[58] Field of Search .................... 354/401–403, 354/408, 409, 432

[56] References Cited

U.S. PATENT DOCUMENTS

| | | | |
|---|---|---|---|
| 5,089,841 | 2/1992 | Yamada | 354/402 |
| 5,122,825 | 6/1992 | Tokumaru et al. | 354/400 |
| 5,158,364 | 10/1992 | Yanogisauh et al. | 354/400 |
| 5,258,801 | 11/1993 | Kusaka et al. | 354/402 |
| 5,422,700 | 6/1995 | Suda et al. | 354/402 |
| 5,426,483 | 6/1995 | Suzuki | 354/410 |
| 5,455,654 | 10/1995 | Suzuki | 354/402 |

FOREIGN PATENT DOCUMENTS 64-44428  2/1989  Japan .
1-274736 11/1989  Japan .
4-213416  8/1992  Japan .

Primary Examiner—Safet Metjahic
Assistant Examiner—D. P. Malley
Attorney, Agent, or Firm—Fitzpatrick, Cella, Harper & Scinto

[57] ABSTRACT

In an imaging system having a variable magnification element, a controller for controlling magnification so as to achieve desirable image composition. An object image is projected onto a visual field of a camera view finder and divided into a number of small blocks. The distance to the image portion in each small block is detected by a multipoint range finder. Small blocks having the same detected distance, or small blocks whose distances differ by less than a predetermined threshold value, are grouped together into one or more medium block(s). An sight line detection sensor detects where, in the visual field of the view finder, a photographer's line of sight is directed. At least one medium block is selected as the final desired image to be photographed on the basis of the sight line determination. The focal length of a zoom lens is determined, depending on the size of the selected medium block and the distance to the image portion it contains, and the lens is automatically driven to the desired focal length and focus condition.

6 Claims, 13 Drawing Sheets

CONTROL FOR VARIABLE MAGNIFICATION IN AN IMAGING APPARATUS

BACKGROUND OF THE INVENTION

The present invention relates to an imaging apparatus having a variable magnification optical system.

An automatic zoom camera in which a zoom lens is automatically driven is known. For example, in the camera disclosed in Japanese Patent Laid-Open No. 64-44428, the distance to a main object is measured, magnification is determined in accordance with a predetermined program based on the measured distance, and a zoom lens is driven. On the other hand, in a camera disclosed in Japanese Patent Laid-Open No. 4-213416, the point at which a photographer, looking at a photographic image plane, directs his visual sight line is measured, and magnification is determined on the basis of the measured point.

However, in these conventional cameras, since the size of a main object is not detected, it is not possible to accurately determine an optimum magnification for a desired image. Therefore, proper automatic zooming cannot be performed.

SUMMARY OF THE INVENTION

It is an object of the present invention to provide an imaging apparatus which is capable of appropriately varying magnification.

To achieve the above object, according to one aspect of the present invention, an imaging apparatus comprises a variable magnification optical system for forming an image of an object at a variable magnification; means for detecting size information corresponding to a portion of the object; and means for controlling the variable magnification of the optical system according to the size information.

According to another aspect of the present invention, the size information is detected by determining the distance to each of plural areas of the object.

According to a further aspect of the present invention, there is provided an imaging apparatus comprising means for specifying which of the plural areas constitute the portion of the object.

According to still a further aspect of the present invention, there is provided an imaging apparatus comprising a variable magnification optical system for forming an image of an object at a variable magnification; a finder for viewing the object; means for dividing the image into an array comprising plural image areas; distance detecting means for detecting a distance to each of the plural image areas; means for defining a plurality of image portions in response to the detected distances; sight line detecting means for detecting which of the plurality of image portions is being viewed; and control means, responsive to the sight line detecting means, for selecting at least one of the plurality of image portions. The control means controls the variable magnification according to a size of the selected image portion.

The variable magnification optical system in accordance with the first and second aspects of the present invention comprises a zoom lens.

The above and further objects, aspects and novel features of the invention will more fully appear from the following detailed description when read in connection with the accompanying drawings. It is to be expressly understood, however, that the drawings are for the purpose of illustration only and are not intended to limit the invention.

DESCRIPTION OF THE PREFERRED EMBODIMENTS

Figure 1:
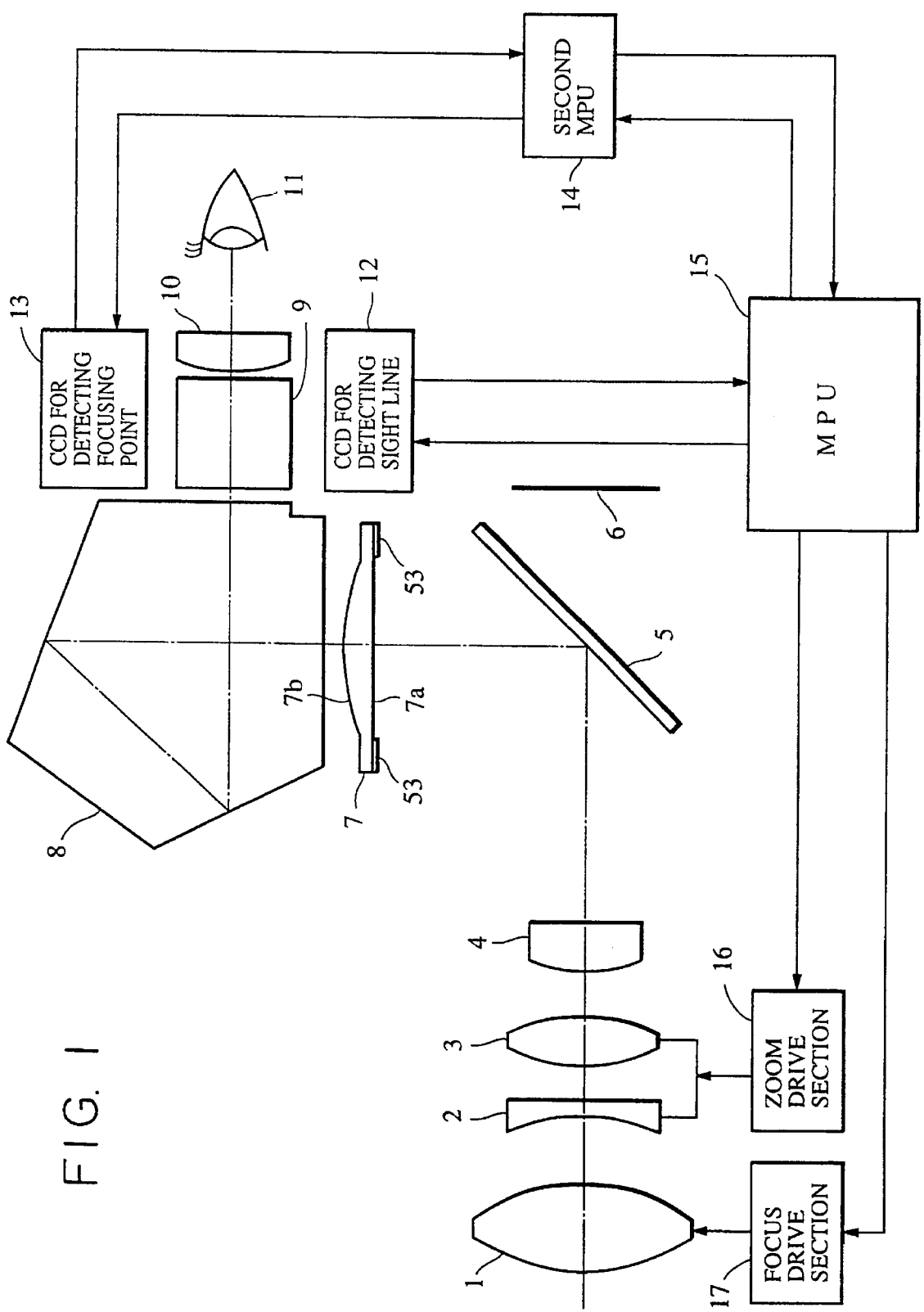
FIG. 1 is a schematic view of a camera in accordance with a first embodiment of the present invention.
Figure 2:
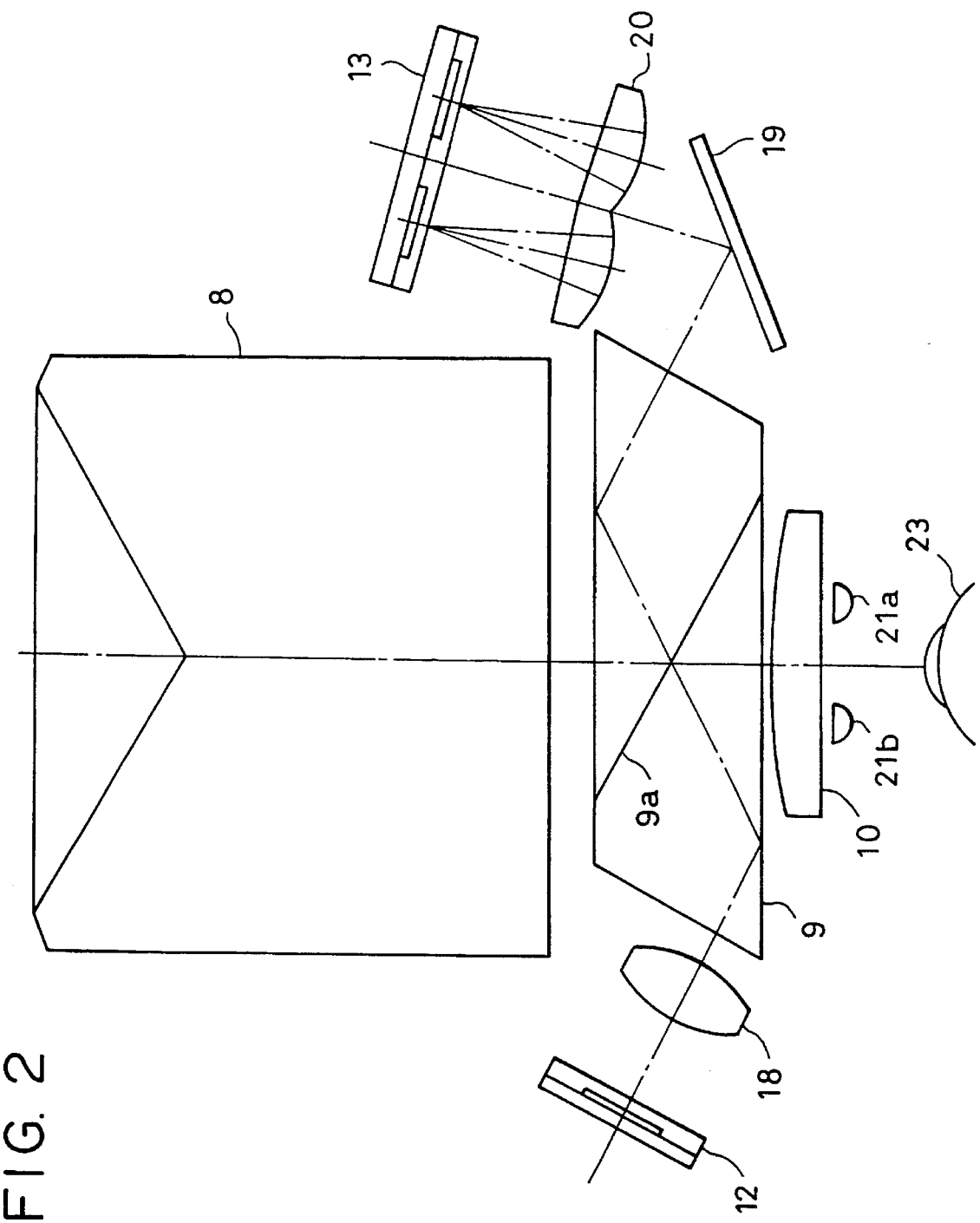
FIG. 2 is a schematic view of a view finder of the camera of FIG. 1.

FIGS. 1 to 12 are illustrations of one embodiment of the present invention. FIGS. 1 and 2 are schematic views of a single-lens reflex camera. FIG. 2 is a top view of an optical layout in the vicinity of a camera view finder.

In FIG. 1, reference numerals 1, 2, 3 and 4 denote lenses which form a photographic lens which is fixed to or removable from a camera body. Lens 1 denotes a focus lens group, by which the photographic lens is focused by moving the focus lens group 1 along an optical axis with a focus drive section 17, formed of a motor, an electric circuit and the like. Lenses 2 and 3 denote a zoom lens group, by which the focal length of the photographic lens can be varied, from a short focal length to a long focal length, by moving the lenses 2 and 3 along the optical axis with a zoom drive section 16, formed of a motor, an electric circuit and the like. Lens 4 is a master lens group by which the photographic lens forms an image on a film surface 6. Reference numeral 5 denotes a reflecting mirror for bending the optical axis by 90° when deployed, and which retracts from the photographic optical path when a shutter opens to expose an image on the film. A focusing screen 7, formed of a field lens portion 7b and a matte portion 7a, positioned on the primary image forming surface of the photographic lens. Reference numeral 53 denotes a field of view mask; reference numeral 8 denotes a penta prism for changing the optical path of the finder; reference numeral 9 denotes an eyepiece; reference numeral 14 denotes a second MPU (microprocessor unit) for driving an area sensor 13 which detects a focusing point and which performs signal processing computations; and reference numeral 15 denotes a first MPU for driving an area sensor 12 which detects a sight line and which performs signal processing for controlling various operations necessary for the camera to take a photograph.

In FIG. 2, reference numeral 9 denotes a prism which includes a semi-transparent mirror section 9a. The prism 9 permits a part of the finder light beam to be transmitted to the eye 23 of a photographer, and reflects the remaining light beam to an area sensor 13 and projects the image of the eyeball 23 of the photographer to area sensor 12 through a lens 18. Reference numeral 19 denotes a mirror for changing an optical path; reference numeral 20 is a secondary image forming lens for performing focusing point detection using a phase difference method to form an image of the photographic field onto the area sensor 13; and reference numerals 21a and 21b denote infrared light emitting diodes for illuminating the vicinity of the eyeball of the photographer; and reference numeral 18 denotes an image forming lens for forming an image of the eyeball of the photographer onto area sensor 12.

Next, a description will be given of the operation of the zoom camera of this embodiment with reference to the flowchart of FIG. 3.

When the power to the camera body is turned on in 100, a signal is transmitted from the first MPU 15 of the camera body to the zoom drive section 16 of the photographic lens, the zoom lens group is moved along the optical axis, until the photographic lens is set at the shortest focal length (101). Next, when a release switch (not shown) for photographing is half-pressed (SW1-ON) in 102, in 103, a focusing point (distance) detection is performed for 150 areas formed when the area within the photographic image plane is subdivided into 10 (vertical)×15 (horizontal) sections by the area sensor 13 and the second MPU 14. The details of this operation will be described later.

Figure 5A:
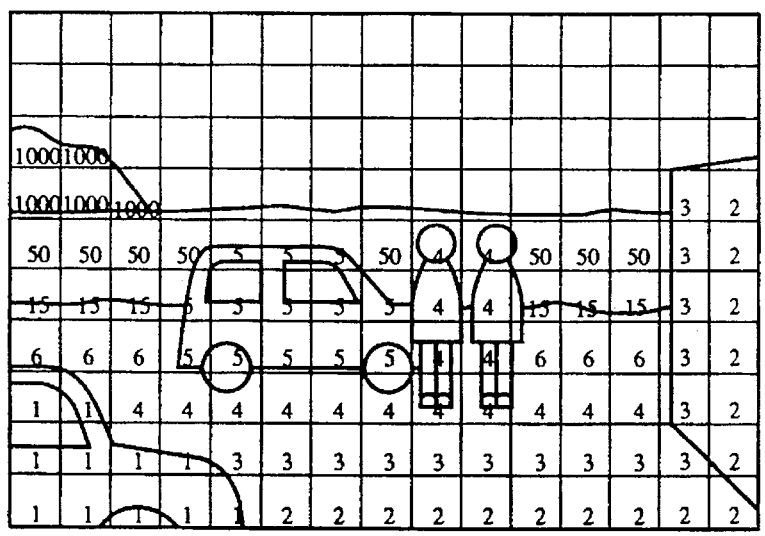
FIGS. 5(A) and 5(B) depict block formation in accordance with the object distance information process of FIG. 4.

FIG. 5(A) illustrates an example of distance information obtained for 150 small blocks on the photographic image plane obtained in the distance detection operation of 103. The value shown in each small block indicates the distance, in meters, to the object simplified for the sake of convenience. The small blocks in which no values are shown represent focusing distances of infinity.

Returning to FIG. 3, at the same time as the focusing point detection 103, an operation for detecting a sight line of the photographer is performed 104 by the area sensor 12 and the first MPU 15. The details of the sight line detection operation will be described later. Also, by taking into consideration the time when the automatic zoom operation of the camera terminates after the switch SW1 is turned on by the photographer and the time it takes to detect the sight line of the photographer, the number of sight line detections is set at 5.

The size of the composition is determined 105 on the basis of the information obtained in the focusing point detection operation 103 and the sight line detection operation 104. This operation will be explained with reference to FIG. 4.

Figure 4:
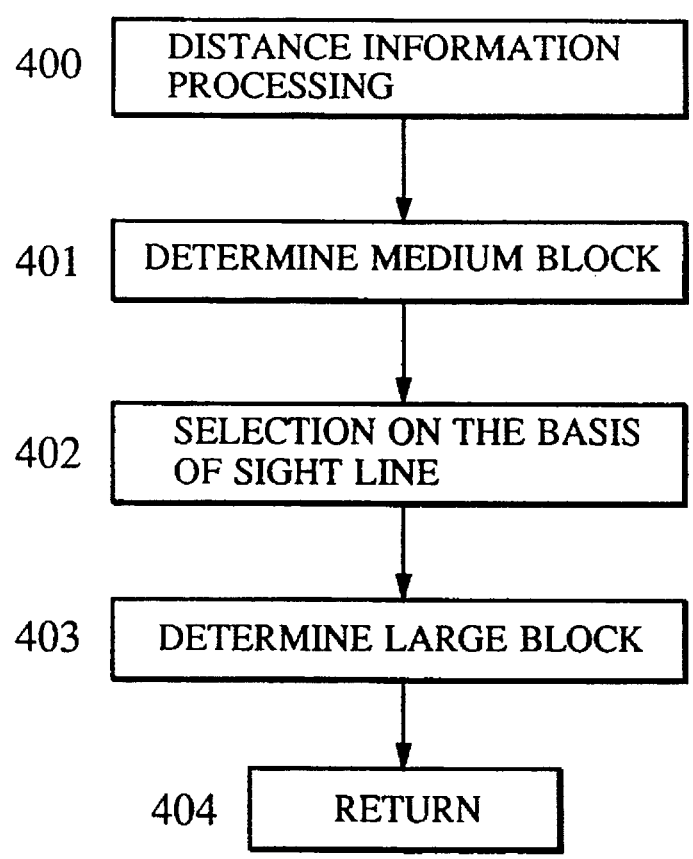
FIG. 4 is a flowchart illustrating the object distance information processing operation of FIG. 3.
Figure 5B:
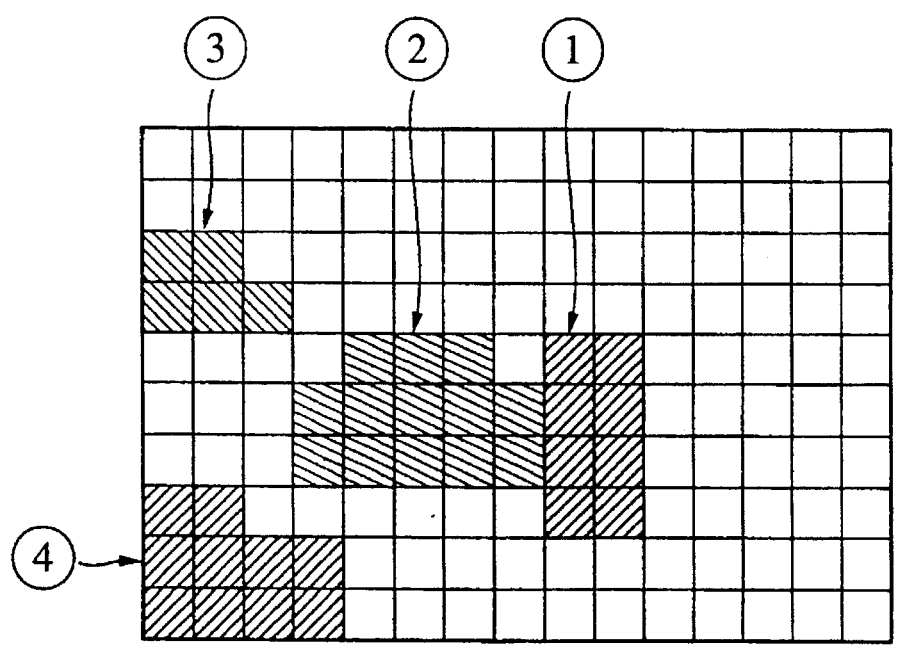

In FIG. 4, distance information to the object obtained in the focusing point detection operation is processed at 400. This processing is for precisely forming an object at a short distance to the photographer into blocks and coarsely forming an object far away into blocks. In this operation, the square root of the distance of each of 150 small blocks obtained in 103 is extracted. Next, in 401, the root distance values, obtained in 400, of each of the small blocks are compared with the root distance values of adjacent small blocks. If the difference is ±20% or less, the adjacent small blocks are regarded as forming a medium block. An example of a medium block obtained in this way is shown in FIG. 5(B). In 402, when at least one of the five points of the sight line of the photographer, obtained in 104, is detected in a specific medium block obtained in 401, that medium block is regarded as being selected by the sight line of the photographer. In 403, a large block is formed which includes all of the one or more medium blocks selected by the sight line information. The large block defines the area which includes all the objects selected by the photographer as objects to be photographed. In 404, the process returns to the main routine.

Figure 3:
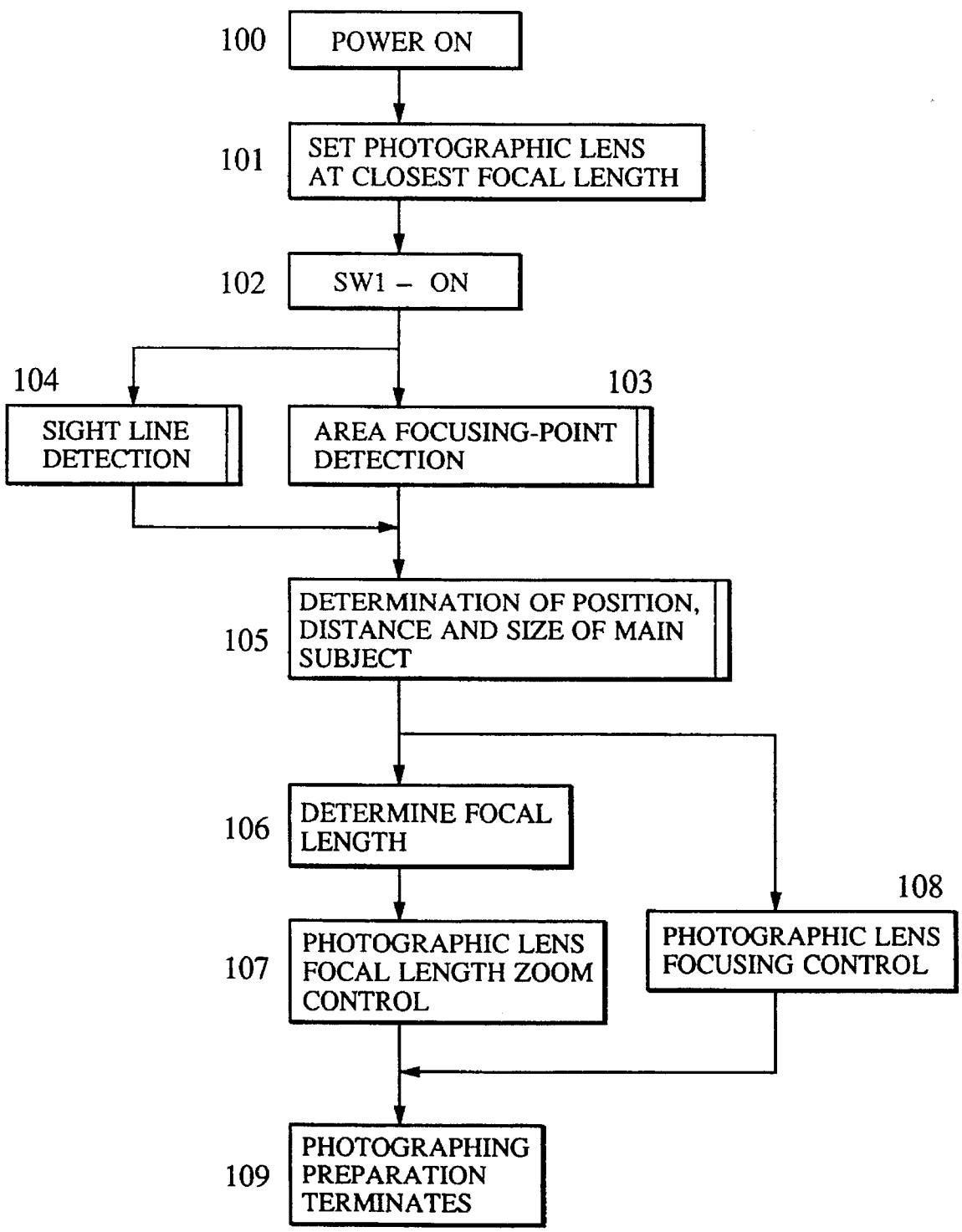
FIG. 3 is a flowchart illustrating the operation of the camera in accordance with the first embodiment of the present invention.

Returning to the flowchart of FIG. 3, in 106, the focal length of the photographic lens is determined such that the area which the photographer desires to photograph (i.e., a large block like that determined in 403) can be kept within the effective photographic horizontal and vertical dimensions (36×24 mm) of common silver halide film. The horizontal and vertical dimensions, on the photographic image plane, of the large block, when the focal length of the photographic lens is shortest, can be calculated on the basis of pixel pitch of the area sensor (13 of FIG. 2). The value obtained by multiplying the ratio of dimensions to the above effective block dimension by the shortest focal length of the photographic lens is the focal length of the photographic lens desired by the photographer. In 107, the zoom drive section 16, shown in FIG. 1, drives the zoom lens group 2 and 3 along the optical axis until the focal length of the photographic lens determined in 106 is reached. In 108, the focus drive section (17, of FIG. 1) drives the focus lens 1 of the photographic lens along the optical axis so that the distance calculated by weighting on the basis of the number of times the point of the line of sight of the photographer is directed to each small block from among one or more of the medium blocks, becomes the focusing distance of the photographic lens.

After the above operation, the camera photographing preparation by the photographer terminates at 109. Of course, photometering, exposure control and the like are also necessary for the preparation of the camera for photographing. However, since these are not related to the present invention, the explanation thereof is omitted.

Figure 6A:
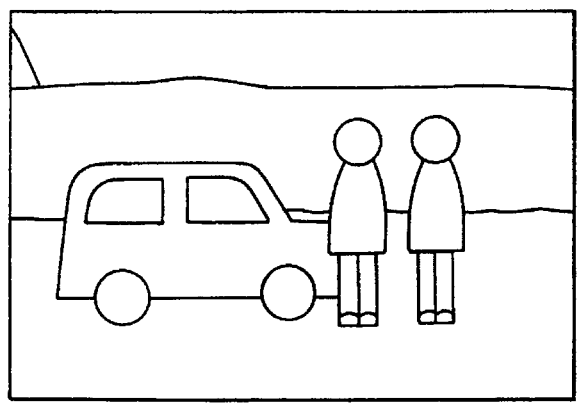
FIGS. 6(A), 6(B) and 6(C) are alternative compositions obtained by object distance information processing in accordance with the invention.
Figure 6B:
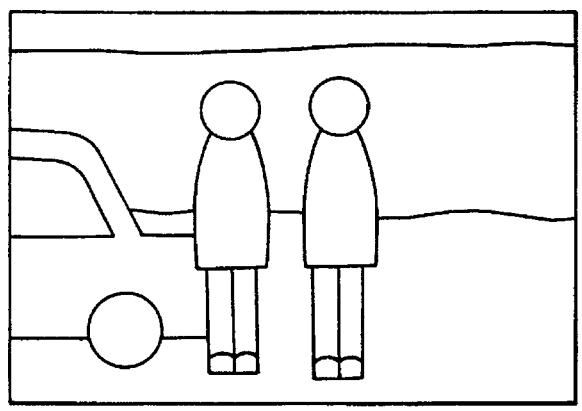
Figure 6C:
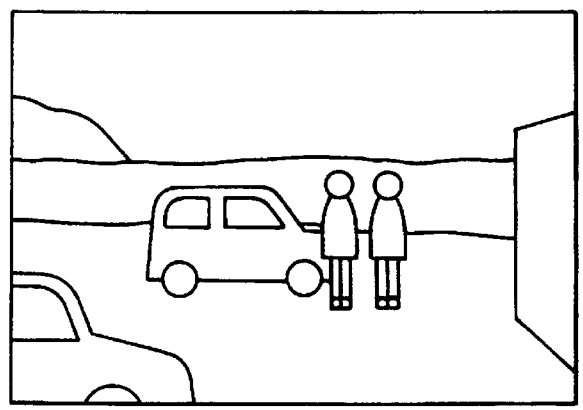

FIGS. 6(A), 6(B) and 6(C) illustrate the effect of this embodiment. FIG. 6(A) shows the photographic image plane when the sight line of the observer was detected three times within block ① and was detected two times within block ② in FIG. 5(B). FIG. 6(B) shows the photographic image plane when the sight line of the observer was detected all five times within only block ①. FIG. 6(C) shows the photographic image plane when the sight line of the observer was detected two times within block ①, two times within block ②, and once within block ③.

Next, a description will be given of means for obtaining a number of object distances from image information on the photographic image plane.

Figure 7:
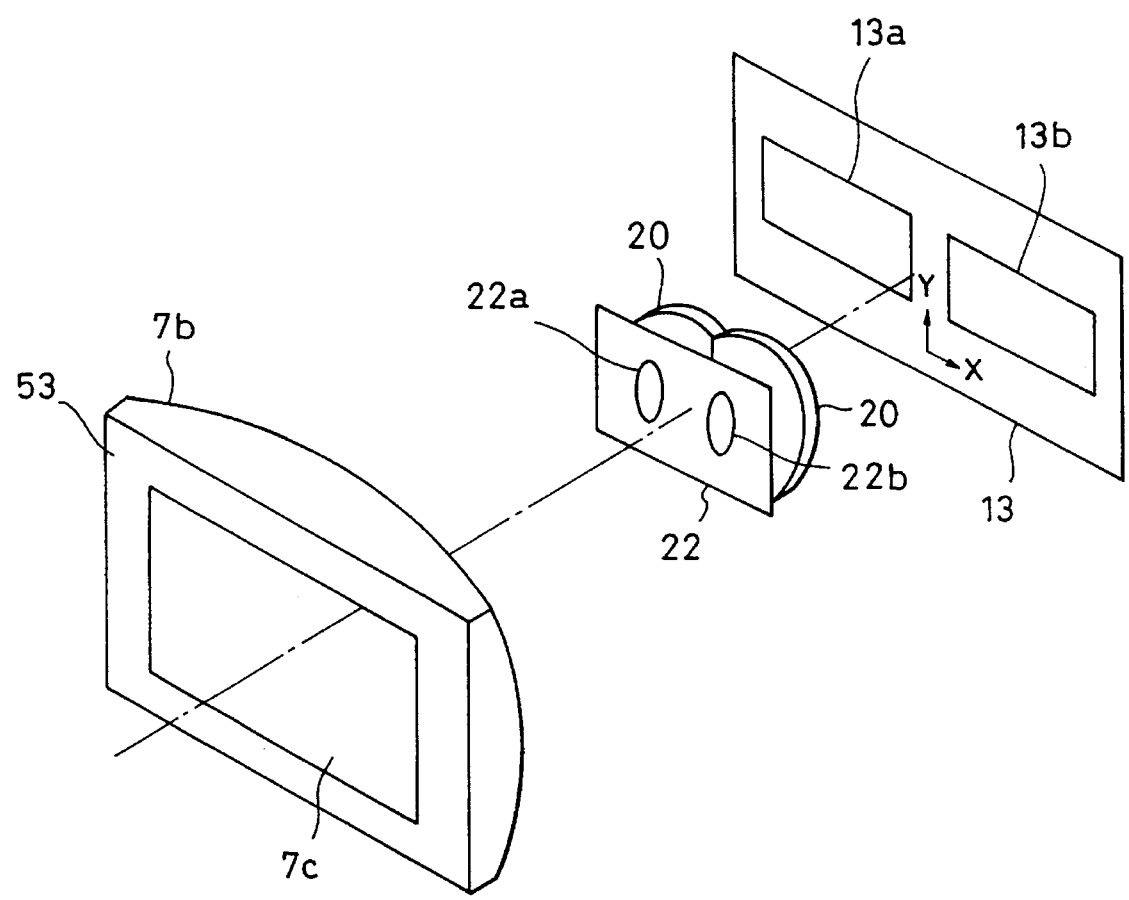
FIG. 7 is a perspective view of a focusing point detection.

FIG. 7 shows an optical system for detecting focusing distance at a number of positions on the photographic image plane, and corresponds to an abridged view of the optical system for detecting focusing points in FIGS. 1 and 2.

A field of view mask 53 is disposed at a position proximate to a predetermined image plane of the photographic lens. The area defined by a single wide opening 7c is the area in which the focusing point can be detected. Since there is little probability of a main object being positioned at an end portion of the image plane, the area defined by the opening 7c may be about 80% of the horizontal and vertical dimensions of the image plane. An aperture plate 22 is placed between the field of view mask and secondary image forming lenses 20. Aperture holes 22a and 22b regulate the light beam which enters each positive lens 20. The aperture plate 22 is positioned approximately in a conjugate imaging relation with the position of the exit pupil of the photographic lens to the field lens 7b. The secondary image forming lenses 20 are formed by two positive lenses constructed such that an object image determined by the opening 7c is directed onto each of a pair of what are commonly called area sensors (hereinafter referred to as CCDs) 13a and 13b in which photoelectric conversion elements are orderly arrayed horizontally and vertically in a two-dimensional manner. The object image signals focused on the two CCDs are read out as electrical information, and focusing point detection computation is performed by a processor (14, of FIG. 1).

In the arrangement employing CCDs, shown in FIG. 7, since there is no means for optically limiting the area, electrical means are provided. In this arrangement, by selectively performing sequential computations on information in a specific area from among the object image read out in a wide range, focusing points at a great number of positions in the photographic image plane are detected.

Figure 8:
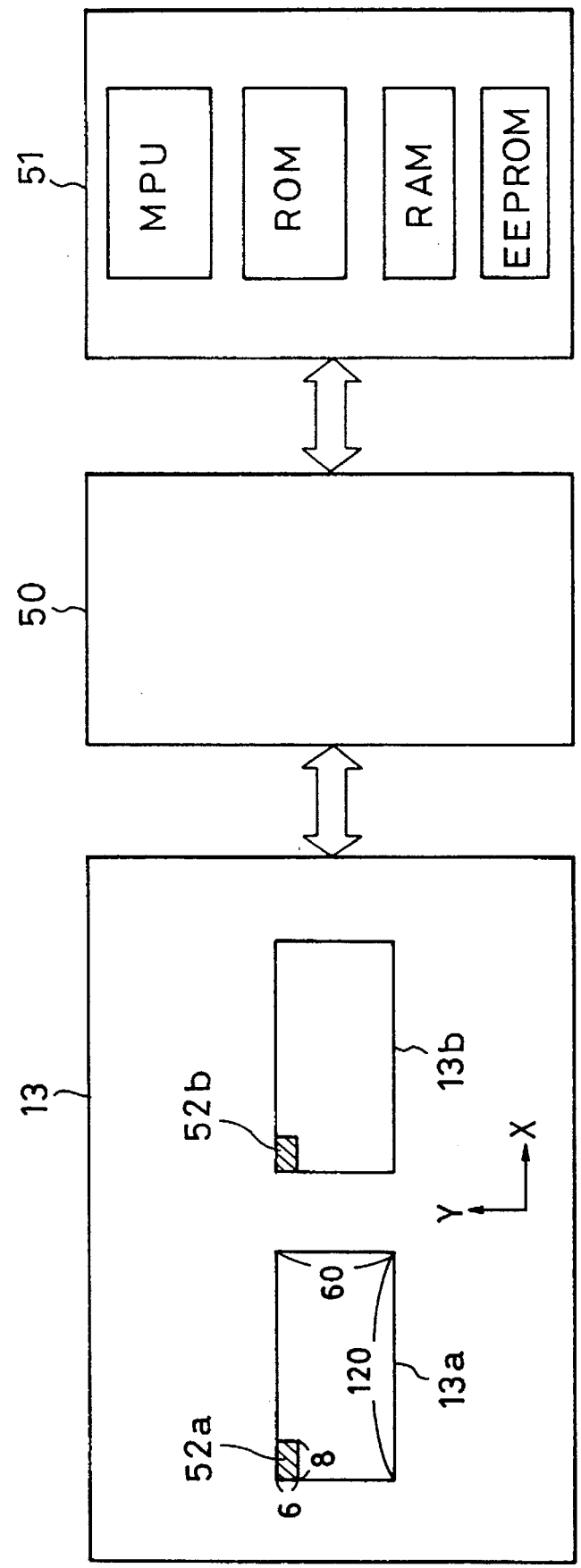
FIG. 8 is a block diagram of a focusing point detector.

The apparatus will be explained with reference to FIG. 8. In FIG. 8, reference numerals 13a and 13b denote CCDs having photoelectric conversion elements for 120 pixels along the x direction and for 60 pixels along the y direction. An interface circuit 50 is connected to the CCD, and area specification and charge storage control are performed via the circuit 50. The interface circuit 50 is connected to a microcomputer 51 which is a processor. The microcomputer 51 has a MPU (microprocessor unit), a ROM, a RAM, and an EEPROM (electrically erasable programmable ROM). The microcomputer 51 performs focusing point detection in accordance with programs stored in the ROM. The positional information on the focusing point detected area and on defective pixels of the CCD are prestored in the EEPROM by an adjustment step or the like.

Figure 9:
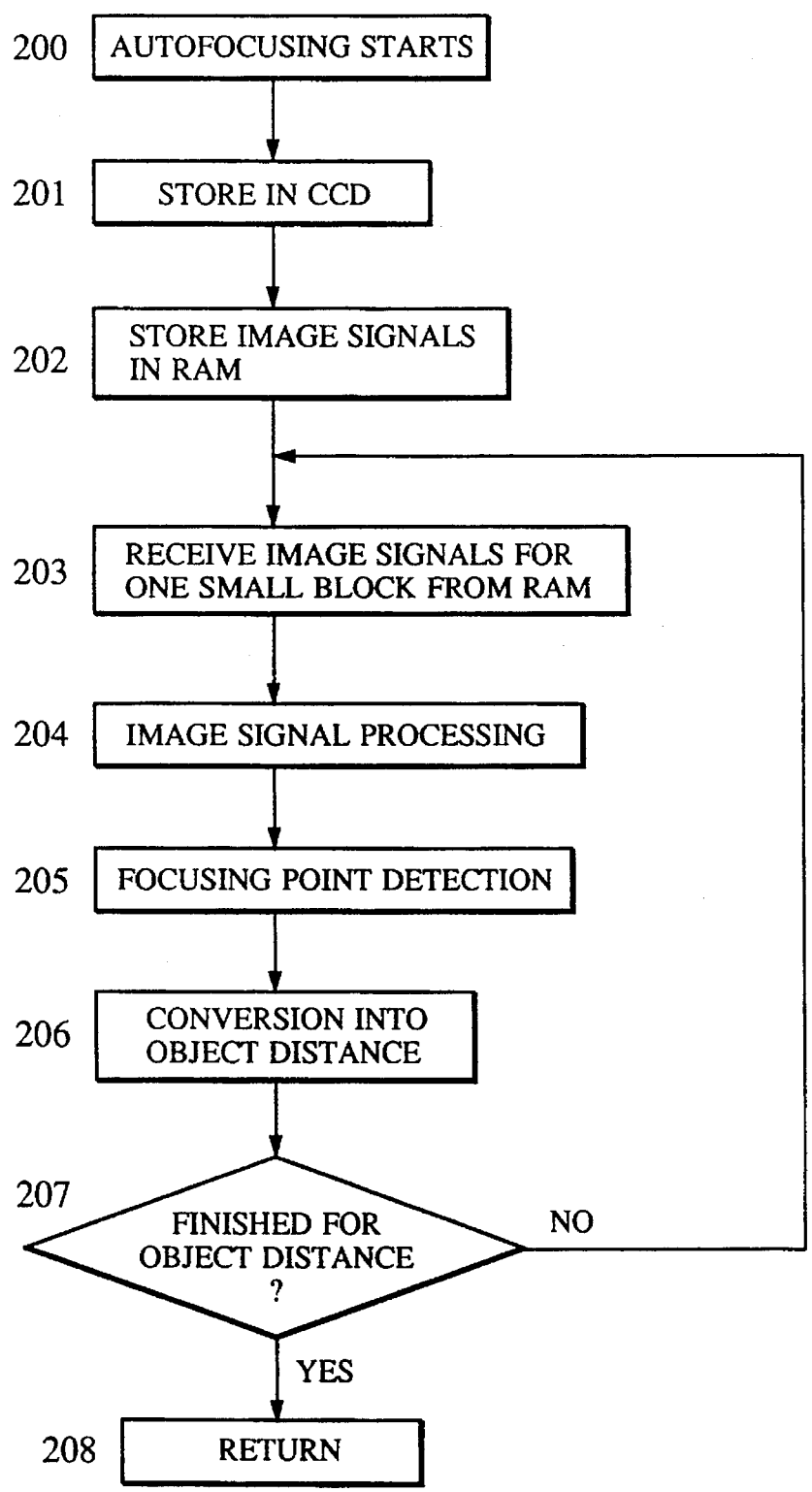
FIG. 9 is a flowchart illustrating the area focusing point detection operation.

FIG. 9 shows a schematic flowchart of an object distance detection program which is stored in the ROM.

The microcomputer 51 starts performing a focusing point detection operation in 200. A CCD storage operation is performed in 201, and a value obtained by A/D conversion of the output voltage of each pixel of the CCD is stored in the RAM in 202. In 203, 24 object image pixel signals of one small block corresponding to 8 pixels along the X direction and 6 pixels along the Y direction are received from the RAM, and in 204, image signal processing is performed. During this operation, the difference in phase between two one-dimensional images is detected with a phase difference detection method. Since pixel signals along the Y direction are added in units of pixels along the X direction, one small block is processed as a one-dimensional image signal formed of 8 pixels along the X direction. That is, the respective image signals of a pair of small blocks 52a and 52b of CCDs 13a and 13b in FIG. 8 are compared with each other in 205. Thus, the focusing point detection of the photographic area corresponding to the area of the small block is made possible. When the focusing point detection is performed, the amount of defocus and its direction can be obtained, in a well known manner, and an amount of displacement of the photographic lens is determined. Therefore, in 206, if the object distance in the small block is denoted as D, and the displacement amount of the photographic lens and the focal length are P and f, respectively, it is possible to determine the object distance on the photographic image plane corresponding to one small block of 8×6 pixels, a part of the CCD 13, on the basis of the following relation $$D = f^2/P.$$

Since the CCD 13 has 120 pixels along the X direction and 60 pixels along the Y direction as described above, the CCD can be divided into a total of 150 8×6 pixel blocks with 15 blocks along the X direction and 10 blocks along the Y direction. In 207, the operation for determining the object distances of each of these small blocks is repeatedly performed. Finally, as shown in FIG. 5(A), it becomes possible to determine the object distance over a wide range of 150 points of the photographic image plane. The process returns to the main routine in 208.

Next, a description will be given of sight line detecting means by which the camera recognizes what portion of the finder image plane, i.e., the focusing screen, of the camera the photographer is looking at.

Hitherto, various apparatuses for detecting what point on the observation plane the observer is looking at, what is commonly called the sight line (eye direction axis), for example, eye cameras, have been described. As a method of detecting the sight line, in for example, Japanese Patent Laid-Open No. 1-274736, a parallel light beam from a light source is projected to a front eye portion of the eyeball of the observer so that the sight line is determined by using a cornea reflection image formed by the light reflected from a cornea and the position of an image of a pupil.

Figure 10:
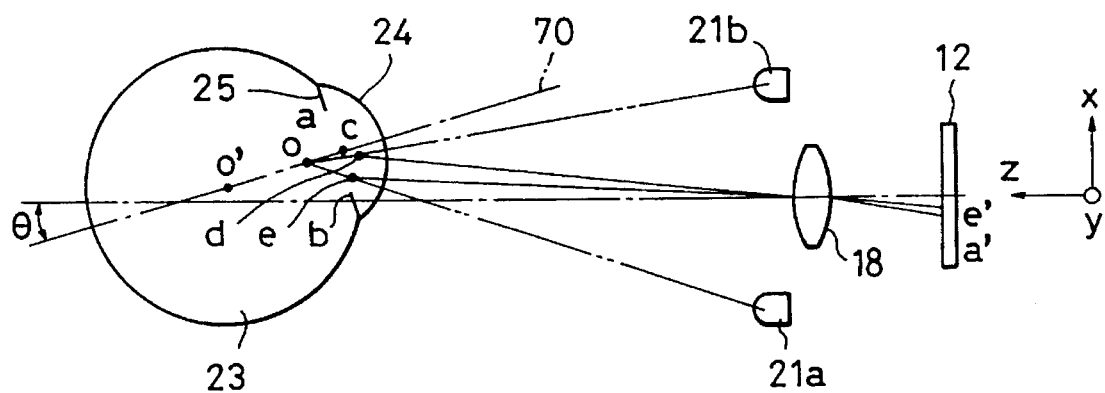
FIG. 10 is a diagrammatic view illustrating the principle of sight line detection.
Figure 11A:
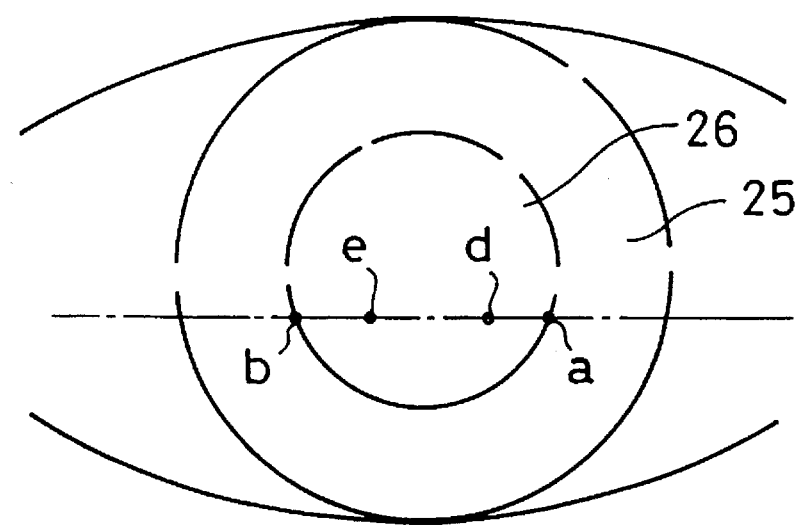
FIGS. 11(A) and 11(B) illustrate additional aspects of sight line detection.
Figure 11B:
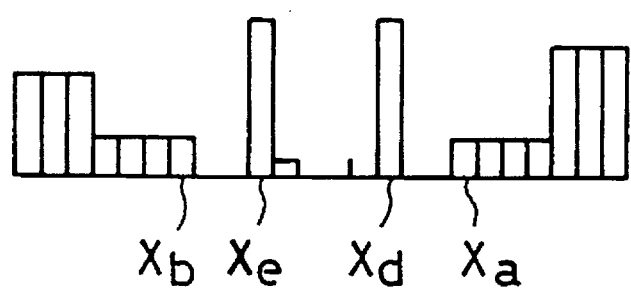
Figure 12:
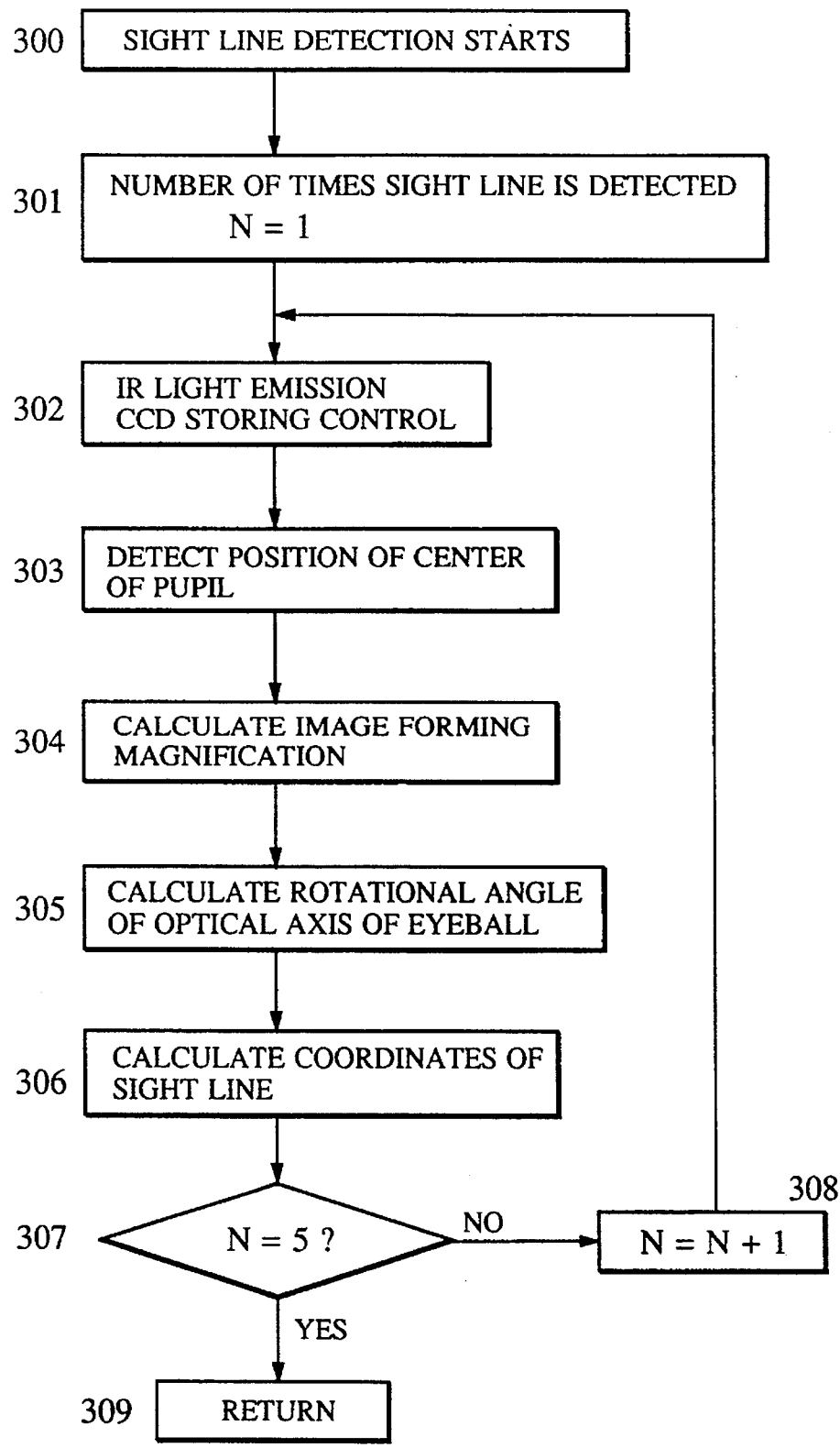
FIG. 12 is a flowchart illustrating the sight line detection operation.

FIG. 10 is a diagram illustrating the principle of the sight line detection method, which corresponds to an abridged view of the optical system for detecting the sight line in FIG. 2. In FIG. 10, reference numerals 21a and 21b denote light sources, such as infrared light sources which are not perceived by the observer. The light sources are disposed along the X direction nearly symmetrically with respect to the optical axis of the light receiving lens 18 and divergently illuminate the eyeball 23 of the observer. A part of the illumination light reflected by the eyeball 23 is focused onto the area sensor 12 (hereinafter referred to as the CCD) by the light receiving lens 18. FIG. 11(A) is a schematic view of the eyeball image projected on the CCD 12, and FIG. 11(B) is an intensity distribution of an output of the CCD 12. FIG. 12 shows a schematic flowchart for detecting a line of sight.

The sight line detection means will be explained below with reference to FIGS. 10, 11(A), 11(B), and 12.

Referring to FIG. 12, when the sight line detection starts in 300, first, in 301, the counter for counting the number of sight line detections is set at N=1. In 302, the light sources 21a and 21b direct infrared light beams to the eyeball 23 of the observer, the eyeball image of the observer illuminated by these light sources is formed on the CCD 12 through the light receiving lens 18, photoelectric conversion is performed by the storage operation of the CCD 12, and the eyeball image can be processed as electrical signals. In 303, the coordinates of the cornea reflection image of the light sources 21a and 21b and the center coordinates of the pupil 26 are determined on the basis of the information on the eyeball image obtained in 302. The infrared light emitted from the light source 21b illuminates the cornea 24 of the eyeball 23, the cornea reflection image "d" (virtual image) formed by a part of the infrared light reflected by the surface of the cornea 24 is focused by the light receiving lens 18, and is formed on the coordinate Xd on the CCD 12. Likewise, the infrared light emitted from the light source 21a illuminates the cornea 24 of the eyeball 23, the cornea reflection image "e" formed by a part of the infrared light reflected by the surface of the cornea 24 is focused by the light receiving lens 18, and is formed on the coordinate Xe on the CCD 12. The light beam from the end portions "a" and "b" of the iris 25 causes images of the end portions "a" and "b" to be formed at the coordinates Xa and Xb on the CCD 12 via the light receiving lens 18. When the rotational angle θ of the optical axis of the eyeball 23 with respect to the optical axis of the light receiving lens 18 is small, the coordinate Xc of the central position c of the pupil 26 is expressed as:

$$Xc \approx (Xa+Xb)/2.$$

Further, in 304, the image forming magnification β of the eyeball image is calculated. β, a magnification determined by the position of the eyeball 23 with respect to the light receiving lens 18, can be determined as a function of the difference |Xd−Xe| of the cornea reflection images. In 305, since the x coordinate of the middle point between the cornea reflection images Pd and Pe nearly matches the x coordinate Xo of the curvature center of the cornea 24, the rotational angle θx of the z-x plane of the optical axis of the eyeball 23 can be determined from the following relation:

$$\beta * OC * SIN\theta x \approx \{(Xd+Xe)\} - Xc. \qquad (1)$$

where the standard distance between the curvature center O of the cornea 24 and the center C of the pupil 26 is denoted as OC.

In FIGS. 10 and 11, an example is shown in which the eyeball of the observer rotates, through rotational angle θ, within the z-x plane (e.g., the horizontal plane). The same method described above applies to calculating the rotational angle θy, when the eyeball of the observer rotates within the z-y plane. When the rotational angles θx and θy of the optical axis of the eyeball 23 of the observer are calculated, in 306, the position (X, Y) on the focusing screen 7c, of a single lens reflex camera, at which the observer is looking, can be determined from:

$$X = m*(Ax*\theta x + Bx) \qquad (2)$$

$$Y = m*(Ay*\theta y + By) \qquad (3)$$

where m is a constant determined by the finder optical system of the camera and is a conversion coefficient for converting the rotational angle into a coordinate on the focusing screen 7c, and Ax, Bx, Ay, and By are sight line compensation coefficients for compensating for the personal differences between observer eyeballs. The coefficients can be determined from reference rotational angles of the eyeball which are calculated when the observer gazes at each of two visual reference marks located at different positions. In 307, a check is made of the number N of sight line detections. When N is less than 5, the counter is set at N=N+1 in 308, and the process returns to 302. When N reaches 5, sight line detection is terminated, and in 309, the process returns to the main routine.

Figure 13:
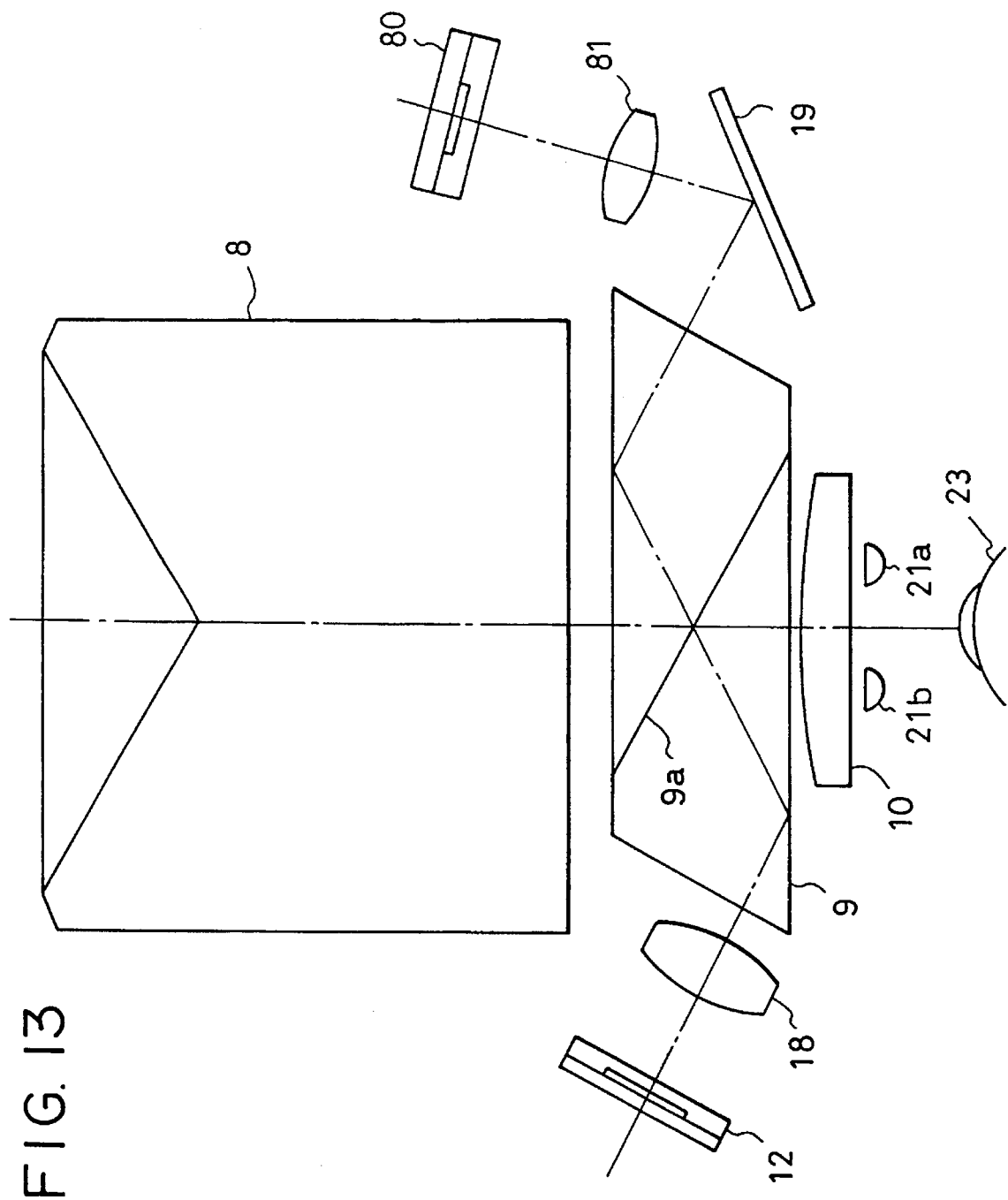
FIG. 13 is a schematic view of a second embodiment of the present invention.

FIG. 13 shows another embodiment of the present invention.

In FIG. 13, reference numeral 80 denotes an area sensor (hereinafter referred to as a CCD); and reference numeral 81 denotes an image forming lens for reimaging a photographic image on the CCD 80. That is, FIG. 13 is a view in which the optical system related to the focusing point detecting means, shown in FIG. 2 and explained with reference to the first embodiment, is replaced with CCD 80 in a single area.

The CCD 80 is formed of, for example, approximately 100 pixels vertically and 150 pixels horizontally. The output of each of the pixels of the CCD 80 is processed by an MPU (not shown), and a block corresponding to a medium block, described in connection with the first embodiment, is determined. During image processing, pixels are regarded as a block if the output difference between adjacent pixels is within a threshold value. Alternatively, pixels are regarded as the edge of an object when the output monotonically increases continuously for several pixels and then decreases. A block is formed based on a boundary obtained from a number of those edges. If a block can be formed, the focal length of a photographic lens can be determined by selecting blocks necessary for photographing according to the sight line of the observer in the same way as in the first embodiment.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. An imaging apparatus having a predetermined image plane, said apparatus comprising:

a variable magnification optical system for magnifying an image in the image plane with a variable magnification;

detecting means for detecting a distance related to each of a plurality of image areas in the image plane means for designating a plurality of image portions by grouping together adjacent image areas having distance values that differ from each other by less than a predetermined amount:

means for manually selecting one of the plurality of image portions designated by said designating means; and means for controlling the magnification of said variable magnification optical system in accordance with a size of the image portion selected by said manual selecting means.

2. An imaging apparatus according to claim 1, wherein said manual selecting means comprises a sight line detector for detecting sight line information of a viewer.

3. An imaging apparatus according to claim 1, wherein said variable magnification optical system comprises a zoom lens.

4. An imaging apparatus having a predetermined image plane, said apparatus comprising:

a variable magnification optical system for magnifying an image in the image plane with a variable magnification;

a finder for viewing the image;

distance detecting means for detecting a distance related to each of a plurality of image areas in the image plane;

means for designating a plurality of image portions by grouping together adjacent image areas having distances that differ from each other by less than a predetermined amount and for detecting a size of each of the plurality of image portions;

sight line detecting means for detecting which of the plurality of image portions designated by said designating means is being viewed; and control means for controlling the magnification of said variable magnification optical system in accordance with the size of the image portion detected by said sight line detecting means.

5. An imaging apparatus according to claim 4, wherein said variable magnification optical system comprises a zoom lens.

6. An imaging apparatus according to claim 4, wherein said apparatus is a camera.

\* \* \* \* \*

UNITED STATES PATENT AND TRADEMARK OFFICE
CERTIFICATE OF CORRECTION

PATENT NO. : 5,589,908
DATED : December 31, 1996
INVENTOR(S) : YOSHIAKI IRIE

It is certified that error appears in the above-indentified patent and that said Letters Patent is hereby corrected as shown below: Title page, item:

[56] References Cited

U.S. PATENT DOCUMENTS

"5,158,364  10/1992  Yanogisauh et al..... 354/400" should read
--5,159,364  10/1992  Yanagisawa et al..... 354/400--.

[57] Abstract

Line 10, "An" should read --A--.

COLUMN 3

Line 15, "eyeball" should read --eyeball 23--.

COLUMN 6

Line 20, "in" should read --in,--.

UNITED STATES PATENT AND TRADEMARK OFFICE
CERTIFICATE OF CORRECTION

PATENT NO.    : 5,589,908
DATED         : December 31, 1996
INVENTOR(S)   : Yoshiaki Irie It is certified that error appears in the above-indentified patent and that said Letters Patent is hereby corrected as shown below:

COLUMN 8

Line 24, "plane" should read --plane;--.

Signed and Sealed this

Twentieth Day of May, 1997

Attest:

BRUCE LEHMAN

Attesting Officer

Commissioner of Patents and Trademarks